US011249965B2

(12) United States Patent
Meron et al.

(10) Patent No.: US 11,249,965 B2
(45) Date of Patent: Feb. 15, 2022

(54) EFFICIENT RANDOM STRING PROCESSING

(71) Applicant: PayPal, Inc., San Jose, CA (US)

(72) Inventors: Avishay Meron, Tel Aviv (IL); Tom Bar Yacov, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 297 days.

(21) Appl. No.: 15/988,723

(22) Filed: May 24, 2018

(65) Prior Publication Data

US 2019/0361998 A1 Nov. 28, 2019

(51) Int. Cl.
*G06F 16/215* (2019.01)
*G06F 16/28* (2019.01)
*G06F 16/901* (2019.01)
*G06F 16/955* (2019.01)
*G06F 16/903* (2019.01)
*G06N 7/00* (2006.01)
*G06N 20/00* (2019.01)

(52) U.S. Cl.
CPC .......... *G06F 16/215* (2019.01); *G06F 16/285* (2019.01); *G06F 16/9017* (2019.01); *G06F 16/90344* (2019.01); *G06F 16/9566* (2019.01); *G06N 7/005* (2013.01); *G06N 20/00* (2019.01)

(58) Field of Classification Search
CPC .. G06F 16/215; G06F 16/285; G06F 16/9566; G06F 16/9017; G06F 16/90344; G06N 20/00; G06N 7/005
See application file for complete search history.

(56) References Cited

U.S. PATENT DOCUMENTS

| 8,095,530 B1 * | 1/2012 | Lloyd | G06F 7/02 707/709 |
| 2003/0172292 A1 * | 9/2003 | Judge | H04L 63/14 726/23 |
| 2005/0060643 A1 * | 3/2005 | Glass | G06F 40/169 715/205 |

(Continued)

OTHER PUBLICATIONS

Gallaugher, Michael P.B., et al. "Clustering and Semi-Supervised Classification for Clickstream Data Via Mixture Models" [online]. Dept of Mathematics & Statistics, McMaster University [retrieved on Feb. 26, 2018]. Retrieved from the Internet: <URL: https://arxiv.org/pdf/1802.04849>.

(Continued)

*Primary Examiner* — Jensen Hu
(74) *Attorney, Agent, or Firm* — Haynes and Boone, LLP

(57) ABSTRACT

Character string analysis and classification can be useful in a variety of contexts, including examining web URLs to determine whether a URL indicates that a user is attempting to take a particular action on an electronic service platform. In some cases, however, URLs or other string data may have "noise" in them, such as random sub-strings, that prevents a string from being properly classified. Sometimes it may be useful to classify a string into a category, however, and it may be important to do this quickly (e.g. during an active user interaction with a website). Learning tables allowing for O(1) lookup can be established by tokenizing strings and then using probability analysis to eliminate tokens that appear an insufficient number of times. This allows for quick and accurate string classification, which may be useful in numerous circumstances.

20 Claims, 5 Drawing Sheets

(56) References Cited

U.S. PATENT DOCUMENTS

| | | | | |
|---|---|---|---|---|
| 2005/0192792 A1* | 9/2005 | Carus | ............... | G06F 40/30 |
| | | | | 704/2 |
| 2009/0281791 A1* | 11/2009 | Li | ............... | G06F 40/284 |
| | | | | 704/9 |
| 2010/0145900 A1* | 6/2010 | Zheng | ............... | H04L 51/12 |
| | | | | 706/52 |
| 2010/0150448 A1* | 6/2010 | Lecerf | ............... | G06K 9/2072 |
| | | | | 382/190 |
| 2011/0055343 A1* | 3/2011 | Gleeson | ............... | H04L 51/12 |
| | | | | 709/206 |
| 2013/0254231 A1* | 9/2013 | Decker | ............... | G06F 16/951 |
| | | | | 707/770 |

OTHER PUBLICATIONS

Freeeman, David M. "Using Naive Bayes to Detect Spammy Names in Social Networks" [online]. AISec '13 Proceedings of the 2013 ACM workshop on Artificial intelligence and security [retrieved on Feb. 26, 2018]. Retrieved from the Internet: <URL: theory.stanford.edu/~dfreeman/papers/namespam.pdf>.

Sadagopan, Narayanan, et al. "Characterizing Typical and Atypical User Sessions in Clickstreams" [online]. WWW '08 Proceedings of the 17th international conference on World Wide Web [retrieved on Feb. 26, 2018]. Retrived from the Internet: <URL:wwwconference.org/www2008/papers/pdf/p885-sadagopanA.pdf>.

"Python—Machine Learning detecting random string" [online]. Stack Overflow [retrieved on Feb. 26, 2018]. Retrieved from the Internet: <URL: https://stackoverflow.com/questions/41769819/machine-learning-detecting-random-string>.

Marshall, Chris "Real-time Clickstream Anomaly Detection with Amazon Kinesis Analytics" [online]. AWS Big Data Blog [retrieved on Feb. 26, 2018]. Retrieved from the Internet: <https://aws.amazon.com/blogs/big-data/real-time-clickstream-anomaly-detection-with-amazon-kinesis-analytics/>.

"What are the methods or tools to detect random jittered strings?" [online]. Quora [retrieved on Feb. 26, 2018]. Retrieved from the Internet: <URL: https://www.quora.com/What-are-the-methods-or-tools-to-detect-random-jittered-strings>.

\* cited by examiner

FIG. 2A

String Group 210

- https://paypal.com/myaccount/card/CC-QWERSDD5345/add/success
- https://paypal.com/myaccount/card/CC-WERSDF5WSDF/add/success
- https://paypal.com/myaccount/card/CC-WERSDF5WSRTYDF/add
- https://paypal.com/myaccount/bank/BA-WERVZCVX35645/add/
- https://paypal.com/myaccount/bank/BA-XCVNBNDFG6456/add/
- https://paypal.com/myaccount/bank/BA-PYOSFDG35E4634/add/

Tokenize Strings 211

| Count | Token |
|---|---|
| 6 | paypal.com |
| 6 | myaccount |
| 3 | card |
| 1 | CC-QWERSDD5345 |
| 6 | add |
| 2 | success |
| 1 | CC-WERSDF5WSDF |
| 1 | CC-WERSDF5WSRTYDF |
| 3 | bank |
| 1 | BA-WERVZCVX35645 |
| 1 | BA-XCVNBNDFG6456 |
| 1 | BA-PYOSFDG35E4634 |

214 / 216 / 212

Apply probability >= 0.20 (operation 220)

| Count | Token |
|---|---|
| 6 | paypal.com |
| 6 | myaccount |
| 6 | add |
| 3 | card |
| 3 | bank |
| 2 | success |

224 / 226 / 222

Clean original strings using revised token table (operation 230)

Cleaned (Reconstructed) Strings 250

- https://paypal.com/myaccount/card/add/success
- https://paypal.com/myaccount/card/add/success
- https://paypal.com/myaccount/card/add
- https://paypal.com/myaccount/bank/add/
- https://paypal.com/myaccount/bank/add/
- https://paypal.com/myaccount/bank/add/

Cleaned Strings Table 275

| URL ID 280 | Cleaned String 285 | Tag 290 |
|---|---|---|
| 231 | https://paypal.com/myaccount/card/add/success | CC_ADD |
| 57 | https://paypal.com/myaccount/card/add | CC_ADD |
| 435 | https://paypal.com/myaccount/bank/add/ | BANK_ADD |

FIG. 3

Partial String Group 310

C:\windows\system32\cache\5453cx34b\file1.jpg
C:\windows\system32\cache\shagjh34o8\file2.jpg
C:\windows\system32\cache\file1.jpg
X:\nfs\documents\plans
C:\windows\users\aac\cache\bzxc343\file1.jpg Cleaned (Reconstructed) Strings 350

C:\windows\system32\cache\file1.jpg
C:\windows\system32\cache\file2.jpg
C:\windows\system32\cache\file1.jpg
X:\nfs\documents\plans
C:\windows\users\aac\cache\file1.jpg

300

EFFICIENT RANDOM STRING PROCESSING

TECHNICAL FIELD

This disclosure relates to processing strings in an efficient manner, which can facilitate accurate categorization of the strings. In some embodiments, removing low-incidence sub-strings (e.g. random sequences) from the strings can allow for quick and accurate categorization, particularly regarding web click stream data.

BACKGROUND

Strings (e.g. a sequence of one or more characters) may appear in various computer contexts. In some instances, the strings can be determined as belonging to one particular category or another. Web click stream data, for example, may indicate different web pages a user has visited. Each of these web pages may have its own particular uniform resource locator (URL). In certain circumstances, string data may have some fairly deterministic or commonly occurring portions, while other portions are non-deterministic (e.g. random) or uncommonly occurring. This can make machine-based categorization of such data difficult or impossible.

BRIEF DESCRIPTION OF THE DRAWINGS

FIG. 2A illustrates a logical flow of operations relating to creating a token probability lookup table and using that table to create cleaned strings, according to some embodiments.

FIG. 2B illustrates a cleaned string table, according to some embodiments.

FIG. 3 is a diagram of an example of how different kinds of strings (e.g. not just web URLs) can be processed and cleaned, according to some embodiments.

DETAILED DESCRIPTION

Figure 1:
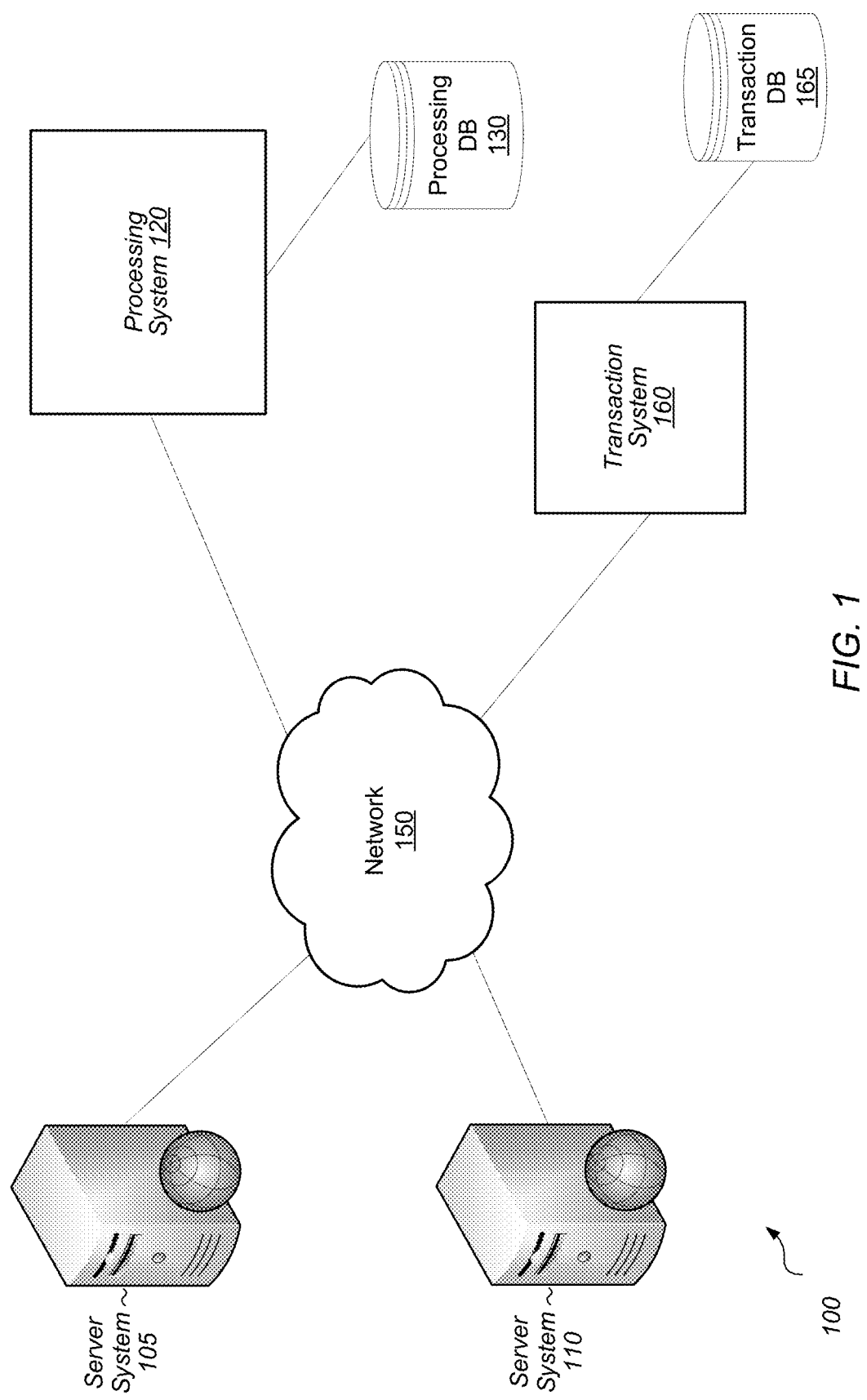
FIG. 1 illustrates a block diagram of a system that includes servers, a string processing system, a transaction system, and a network, according to some embodiments.

As described herein, particular algorithms may be used to determine when low probability (e.g. random) sub-strings should be removed from larger strings, which can effectively reduce noise within the larger strings and allow for better data collection. Cleaning strings in this fashion allows for a variety of techniques—such as machine learning and/or automatic data classification—to be applied where they may have been difficult or impossible previously due to high amounts of variation within the string data. Further, the solution herein can be generalized and is not limited to working within a particular scheme (e.g. reliant on a particular data format and/or type of data).

Strings may contain unique or uncommon portions that can make classification of the string different. In the case of URLs for a web service, for example, different users may encounter a different URL that performs the same functions. One web page for changing a first user's account password might be https://www.domain.com/passwd/H4cq7943q51/edit, while a web page for changing a second user's account password might be https://www.domain.com/passwd/0c24MG5Zp7/edit. Although these URLs correspond to the same function (password change), they contain a dynamic portion that is very different for each user. If this dynamic portion is removed from the URL strings, the resulting strings are both identical: https://www.domain.com/passwd/.../edit. Thus, removing the dynamic portion of the URL can allow for more easy categorization (e.g., if all web pages resolve to identical, or at least more similar URLs after being processed).

A difficulty arises, however, in being able to identify which portion(s) of a string might be low relative occurrence (e.g. random) and which portions are high relative occurrence/deterministic. For smaller web services, it may be feasible to use rules to perform the URL processing—for example, "always remove the character string between 'passwd/' and '/edit'", to continue the example above. Such an approach is extremely burdensome, however, in a larger service with numerous different web pages and web services. Keeping dozens, hundreds, or even thousands (or more rules) manually updated is a recipe for error. Thus, a generalized and automated approach can provide tangible benefits.

One generalized approach to eliminating random sub-strings from other strings uses tokenizing to break up strings into fragments, and then utilizes probability analysis to discard strings with low relative occurrence. This approach is outlined below. Note that while the term "random" will be used herein for ease of simplicity, the techniques herein are not limited to only random strings. Rather, these techniques can be applied to eliminate any sub-string data where there is a relative lower frequency of occurrence for the sub-string data relative to other portions of strings.

A first batch of data can be collected that contains various strings. This may be, for example, the URLs of all the web pages at one or more domains that users have clicked on in the last month (or some other time period). The strings can then be tokenized, e.g., parsed and broken up into sub-strings based on the occurrence of the backslash '|' character. Statistical data for each of the sub-strings is collected to determine which sub-strings appear to be random and which are deterministic, for example. A sub-string (such as "www.paypal.com") might appear 250,000 times while another sub-string might appear only twice. Sub-strings below a particular threshold level (e.g. 0.5%, or some other threshold) can then be discarded.

When a new, unknown string is encountered (when a user loads a new web page for example), that string can itself be tokenized and have each of its token sub-strings compared to a probability table based on the initial sample data. A sub-string that doesn't appear in the probability table may be assumed to be random and discarded from the primary string. The unknown string is thus "cleaned" of any low-probability tokens by removing those sub-strings, resulting in a cleaned string that consists of relatively high incidence tokens, according to various embodiments.

The resulting cleaned version of the new string can then be used for predicting a classification for the string, e.g., the cleaned string may correspond to a particular web software function such as changing a password, adding a new funding source to an online payment wallet, editing a user profile setting, or any number of possible different actions. String classifications are not limited to only web functions, however. The techniques disclosed herein may be used generally in any number of different contexts—and further, string cleaning techniques may be used independently from classification techniques (based on the cleaned strings) in various embodiments.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Turning to FIG. 1, a block diagram of a system 100 is shown. In this diagram, system 100 includes server systems 105 and 110, a processing system 120, a transaction system 160, and a network 150. Also depicted is transaction DB (database) 165 and processing DB (database) 130. Note that other permutations of this figure are contemplated (as with all figures). While certain connections are shown (e.g. data link connections) between different components, in various embodiments, additional connections and/or components may exist that are not depicted. Further, components may be combined with one other and/or separated into one or more systems.

Server systems 105 and 110 may be any computing device configured to provide a service, in various embodiments. Services provided may include serving web pages (e.g. in response to a HTTP request) and/or providing an interface to transaction system 160 (e.g., a request to server system 105 to perform a transaction may be routed to transaction system 160). Processing system 120 may comprise one or more computing devices each having a processor and a memory, as may transaction system 160. Network 150 may comprise all or a portion of the Internet.

In various embodiments, processing system 120 can take operations related to cleaning strings, such as URL strings, of random and/or low probability data. This may facilitate classification of those strings, which can be helpful when attempting to classify an event with respect to a risk determination, among other things.

Transaction system 160 may correspond to an electronic payment transaction service such as that provided by PayPal™. Transaction system 160 may have a variety of associated user accounts allowing users to make payments electronically and to receive payments electronically. A user account may have a variety of associated funding mechanisms (e.g. a linked bank account, a credit card, etc.) and may also maintain a currency balance in the electronic payment account. A number of possible different funding sources can be used to provide a source of funds (credit, checking, balance, etc.). User devices (smart phones, laptops, desktops, embedded systems, wearable devices, etc.) can be used to access electronic payment accounts such as those provided by PayPal™. In various embodiments, quantities other than currency may be exchanged via transaction system 160, including but not limited to stocks, commodities, gift cards, incentive points (e.g. from airlines or hotels), etc. Transaction system 160 may also correspond to a system providing functionalities such as API access, a file server, or another type of service with user accounts in some embodiments.

Transaction database (DB) 165 includes records related to various transactions taken by users of transaction system 160 in the embodiment shown. These records can include any number of details, such as any information related to a transaction or to an action taken by a user on a web page or an application installed on a computing device (e.g., the PayPal app on a smartphone). Many or all of the records in transaction database 165 are transaction records including details of a user sending or receiving currency (or some other quantity, such as credit card award points, cryptocurrency, etc.). The database information may include two or more parties involved in an electronic payment transaction, date and time of transaction, amount of currency, whether the transaction is a recurring transaction, source of funds/type of funding instrument, and any other details. Processing DB 130 may be used to store various information related to string processing and/or string classification Turning to FIG. 2A, a diagram 200 is shown relating to a logical flow of operations for creating a token probability lookup table and using that table to create cleaned strings. This figure illustrates certain aspects of techniques described in more detail relative to FIG. 4. Operations performed in this figure may be done by processing system 120 and/or another system.

In this figure, string group 210 includes several URLs, which may be part of web click stream data. In operation 211, these strings are tokenized and stored into an initial data store 212. Tokenizing involves breaking up the strings in string group 210 according to one or more de-limiting patterns and/or removing extraneous data. In this case, the "HTTPS:" is removed from the strings, and the remainder of the strings is tokenized with the backslash ('P') character as a de-limiter. Each of the tokens is stored in token column 216, with a corresponding count in column 214. The count represent the number of occurrences for that token across all strings in string group 210, according to this example.

In operation 220, a probability threshold is applied to initial data store 212 to produce a token probability lookup table 222. In this example, all tokens having a probability occurrence of less than 0.20 (20 percent) are discarded from the initial data store 212. All tokens with 20% or greater occurrence are retained and stored into token probability lookup table 222.

For this example, that means that only once occurring token sub-strings (e.g., "CC-QWERSDD5345", "BA-XCVNBNDFG6456") are discarded, as their occurrence is ⅙ or ~0.1667, which is less than 20%. These sub-strings may be random data or otherwise low probability data. Higher probability tokens such as "paypal.com" are retained in column 226 (with a corresponding count in column 224).

In operation 230, the original string group 210 is cleaned using the token probability lookup table 222. All sub-strings that do not appear in table 222 are removed from original string group 210. The results are shown in cleaned (reconstructed) strings table 250.

Turning to FIG. 2B, one embodiment of a cleaned strings table 275 is shown. This table is derived from the example of FIG. 2A. URL ID 280 is a column showing a unique ID for a particular URL. Cleaned String 285 is a column showing what the cleaned strings look like from table 250 (without any duplicates). Tag 290 is a column showing the label associated with the cleaned strings. For example, the label may indicate that the URL is associated with a particular action and/or transaction flow, such as adding a credit card or new bank account to an electronic payment transaction service (such as that provided by PayPal™). In various embodiments, all the strings in a learning data set are already labeled (although these labels are not shown in FIG. 2A for simplicity's sake).

Turning to FIG. 3, a diagram 300 is shown of another example of how different strings (not web URLs) can be processed and cleaned. In this example, partial string group 310 represents certain strings from a larger group of file paths. Cleaned (reconstructed) strings 350 show what these strings might look like after performing cleaning, in which random/low probability tokens are removed. (Depending on the data set, some particular threshold probability may be used to convert partial string group 310 to cleaned strings 350).

Figure 4:
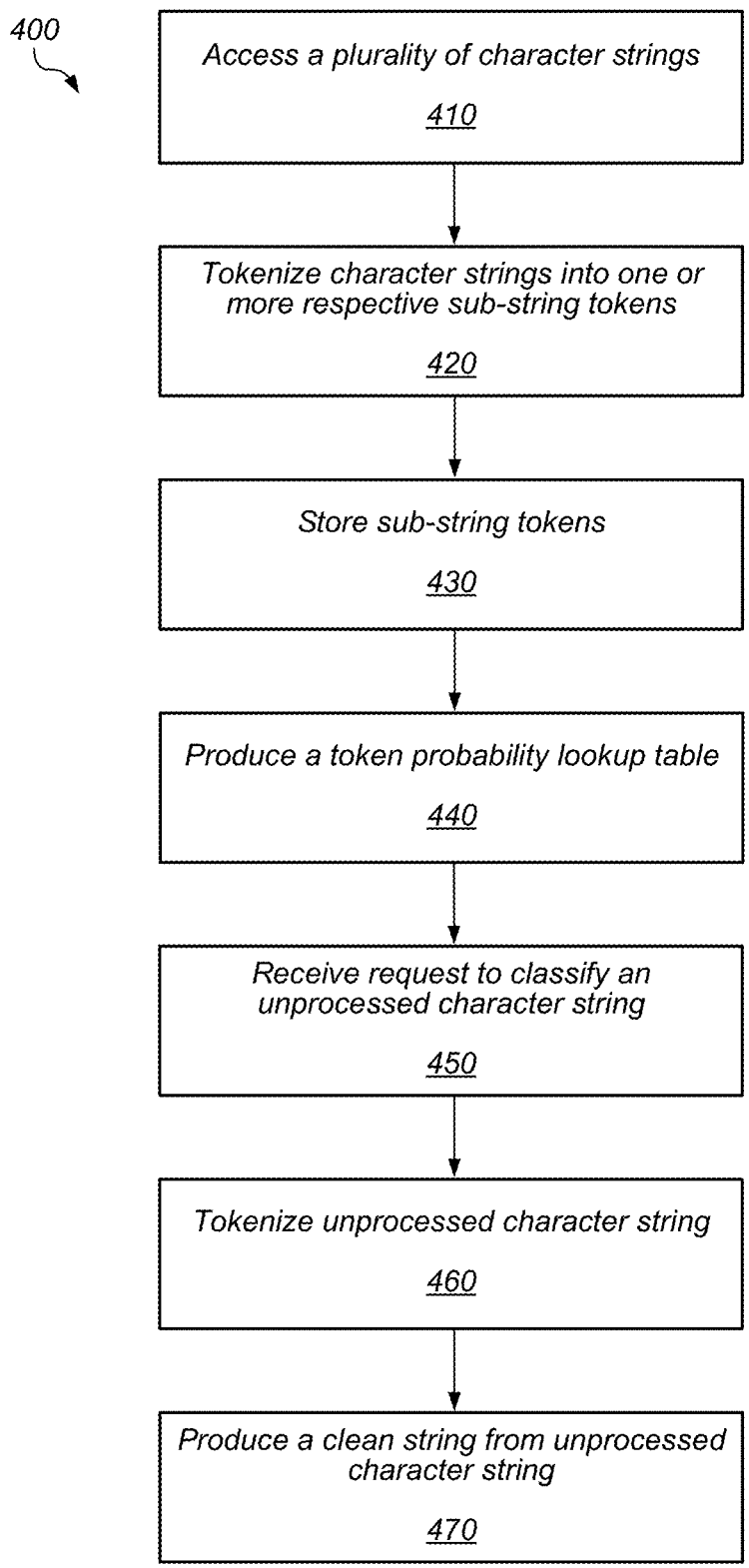
FIG. 4 illustrates a flow diagram of a method that relates to processing strings, including removing random or low probability sub-strings from larger strings.

Turning to FIG. 4, a flowchart is shown of one embodiment of a method 400 relating to processing strings, including removing random or low probability sub-strings from larger strings.

Operations described relative to FIG. 4 may be performed, in various embodiments, by any suitable computer system and/or combination of computer systems, including processing system 120. For convenience and ease of explanation, however, operations described below will simply be discussed relative to processing system 120 rather than another system. Further, various elements of operations discussed below may be modified, omitted, and/or used in a different manner or different order than that indicated. Thus, in some embodiments, processing system 120 may perform one or more aspects described below, while another system might perform one or more other aspects.

In operation 410, processing system 120 accesses a plurality of character strings, according to various embodiments. These character strings may include web URLs, such as URLs belonging to a group of web click stream data (e.g. various web pages that one or more users have accessed in a particular time period). Web click stream data may be collected for one or more web sites such as PayPal.com, for example. Web click stream data is not limited to browser hits; it may include resources accessed by smartphone apps or other applications.

Click stream data may be indicative of a particular action that a user is taking relative to an electronic service, such as attempting to make a payment transaction, adding a new funding source to an electronic wallet, etc. Certain types of actions may be assessed for risk before a service allows the action to be completed. Thus, it may be helpful to know if a particular web resource corresponds to a particular type of action when assessing risk. A user making a cash transfer to a banking account (cash out) may be riskier than a user making a purchase from a merchant using an existing account balance, for example. The type of action a user is taking may also inform the use of a particular risk assessment algorithm.

The character strings may also include file system path names in some instances, such as a list of files and/or directories accessed by a particular user, a particular system, and/or a particular program. Other types of data are also contemplated. Further, although often referred to as character strings in this disclosure, the techniques herein are not limited to the use of only characters such as characters belonging to the ANSI set or some other standard. The term character string may encompass any data in some embodiments, e.g., even binary data could be processed according to the present techniques.

In operation 420, processing system 120 tokenizes each of the character strings into one or more respective sub-string tokens, according to various embodiments. This tokenizing involves using one or more de-limiters to break a character string into sub-strings. In the case of URL strings, the backslash '/' character may be used as a de-limiter. Thus a URL such as https://www.paypal.com/myaccount/home could be tokenized into "www.paypal.com", "myaccount", and "home". (In this example, the preceding "https:" is discarded. Multiple different de-limiters or de-limiting patterns can be used as desired according to the formatting of the data being used. As described below, tokenizing a character string allows one or more of its sub-strings to be removed (e.g. when the string is a low occurrence/random data string).

In operation 430, processing system 120 stores the sub-string tokens for each of the character strings in an initial data store, according to various embodiments. The sub-string tokens may be stored along with a count of occurrence. For example, in a list of 50,000 web URLs that were accessed by users of the PayPal™ service, there might be 48,000 occurrences of the token "www.paypal.com", 26,500 occurrences of the token "myaccount", etc. In the case of user-specific or other low-probability URL string portions, however, these might occur only a handful of times out of the 50,000 hits. The initial store of sub-string tokens can be in a database table or any other suitable data structure. One of the main reasons to store the token sub-string data is simply to make the data available as intermediate results for further processing, as described below, according to various embodiments.

In operation 440, processing system 120 processes the initial data store to produce a token probability lookup table, according to various embodiments. This processing may include storing sub-string tokens that meet a threshold probability level and discarding sub-string tokens that do not meet the threshold probability level.

More particularly, when a set of character strings (such as URLs, file pathways, or others) includes some low occurrence and/or random portions, it can be desirable to discard these portions to achieve uniformity in the data set. Users who perform the same operation may, for various reasons, access URLs that are similar or identical in most respects but different for certain portions. (See, e.g., FIG. 2A).

Such low-occurrence and/or random string portions can be discarded according to programmed rules, if the formatting of the random portions is known apriori. For example, if it is known that a URL for adding a new credit card to an online payment wallet will have the form "www.paypal.com/myaccount/addCC/username+randomnumber/submit", then the "username+randomnumber" portion could be removed with a simple rule.

A more general solution is preferable however, because as services change, such specific parsing rules will become outdated and need to be constantly updated. Further, when a large number of services are offered, it may be logistically difficult to determine the various URL formats for all the different services. (Similar shortcomings may exist in other data contexts besides character strings for URLs.)

Thus, a token sub-string may be deemed to be of adequate probability if it occurs at least a certain number of times in a data set of character strings. Tokens below a probability threshold can be discarded as being random and/or low probability, while tokens above that threshold are retained. The probability threshold may be set manually, e.g., at 0.2%, 5%, 25%, or any other desired value. The probability threshold may also be determined automatically in various ways.

Tokens that occur with at least a certain amount of frequency (such as "www.paypal.com" or "myaccount" may be stored in a token probability lookup table. The token probability lookup table indicates that each token within the table occurs with at least some minimum probability in the character string data set. If the token is discarded and not stored in the table, however, then it fails to meet this probability level.

Once the token probability lookup table is built, it can be used to clean future character strings of random or low probability tokens. Thus, if the token string "3zxzdf32ser" or "Ulysses29" doesn't appear in the token probability lookup table, it can be assumed to be random or low-probability and therefore discarded when generating a clean string, as discussed below.

In operation 450, processing system 120 receives a request to classify an unprocessed character string, according to various embodiments. A risk assessment algorithm, for example, may wish to be able to classify whether a particular URL belongs to particular transaction flow and/or web service, but is unable to easily determine this due to potential random data in the URL string. For example, a user may seek to make an electronic funds transfer, but the URL of the web page accessed for this task has a series of random characters. The risk service may make a request to have the URL string cleaned. Cleaning of the string may proceed as outlined below.

In operation 460, processing system 120 tokenizes the unprocessed character string, according to various embodiments. This may be similar to the tokenization outlined above, e.g., splitting the unprocessed character string into one or more sub-string tokens. One or more portions of the unprocessed character string may also be discarded, in some embodiments (e.g. discarding a preceding "HTTPS://" from the string.

In operation 470, processing system 120 produces a cleaned string from the unprocessed character string, according to various embodiments. This may be achieved by discarding any tokens from the unprocessed character string that are not present in the token probability lookup table, in some instances. Each of the token sub-strings in the unprocessed character string can be individually compared to the token probability lookup table. If that token sub-string appears in the table, it is kept, but if that token sub-string does not appear in the token probability lookup table, however, it is discarded, according to one embodiment. As a result, one or more sub-strings may be removed from an unprocessed character string to produce a cleaned string that has no random or low-probability sub-string tokens. This cleaned string can then be used for classification purposes (e.g. determining what tag belongs to a particular URL).

One advantage of using a token probability lookup table as described above is the ability to quickly process character strings. The lookup table may be accessed according to O(1) time, as it can be a very simple query to determine whether a particular string is present (or not present) in the table. The token probability lookup table (and all lookup tables discussed herein) may be ordered in some fashion, e.g., low value to high value, to facilitate rapid lookups. Being able to quickly process character strings can be important, especially in large volume environments where millions of users may access a service in any given period of time.

In one embodiment, method 400 also includes processing a plurality of character strings into a cleaned strings table, including eliminating tokens from the plurality of character strings that are not present in the token probability lookup table. This cleaned strings table may be similar to cleaned strings table 275, for example. The character strings (e.g. from a learning data set) can each be cleaned of random/low-probability sub-strings for storage. Further, each of the plurality of character strings may be labeled as belonging to a category in a plurality of categories. Thus, each string in a learning data set may be already labeled as being associated with some particular thing (e.g. a transaction, a software flow, or any category desired).

In another embodiment, processing the plurality of character strings into a cleaned table strings includes avoiding any duplicate strings being stored in the cleaned strings table. Thus exact duplicates or substantial duplicates may be removed (or not stored) in the cleaned strings table. A substantial duplicate may include strings that are similar or identical except for a de-limiting character, punctuation, etc., and/or may include being a close enough match (e.g. matches within 1 or 2 characters or within 95%), in various embodiments. Removing duplicates may also be done as part of applying a learning model, however.

Processing the character strings can include labeling each of the strings in the cleaned strings table, according to a model, as belonging to one of the plurality of categories. The labeling may be done, in some instances, by applying a Bayesian learning model onto the cleaned strings table (and/or to precursor data such as a string table that has been cleaned but not de-duplicated). The resulting output from the learning model can increase the probability of hits on the final table.

Method 400 may also include receiving a user request associated with an unprocessed character string, categorizing a cleaned string (from the unprocessed string) into one of a plurality of categories (e.g. based on a model), and causing an action to be taken in response to the user request based on the category for the cleaned string. For example, a user might make a request to initiate an electronic payment transaction, or to move a file to a particular directory. This request may be associated with a particular string (e.g. a URL that the user has visited and/or via which the request is being submitted).

A string associated with the user request, such as a URL, can be cleaned using a token probability lookup table as described above, and then the resulting cleaned string can be categorized according to a cleaned strings table (which could be generated from a Bayesian or other learning model). Based on the categorization for the URL string, the user's request might be approved or denied, or could be subjected to heightened requirements. E.g., a user's request to withdraw funds might be elevated to require two factor authentication (such as a text message to a cell phone), an answer to a security question, or some other measure.

Note that multiple strings (and their associated label) may be used to make a decision about a user request. If a user has visited, in the last hour, ten different web pages on PayPal.com that relate to adding a new transaction instrument to an electronic wallet for example, this could potentially indicate a higher risk of fraud (e.g. it may be likely that someone who tries to add 10 new credit cards in a short span of time is a fraudster). Labels for these pages could inform another risk decision (e.g. should the user be allowed to transfer $8,000 from her account as requested).

Computer-Readable Medium

Figure 5:
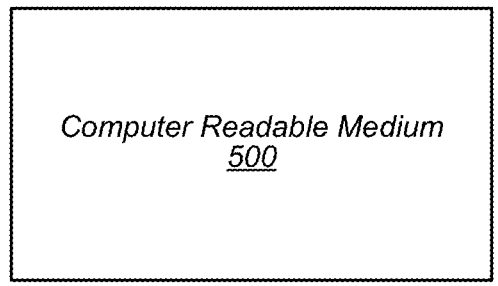
FIG. 5 is a diagram of a computer readable medium, according to some embodiments.

Turning to FIG. 5a block diagram of one embodiment of a computer-readable medium 500 is shown. This computer-readable medium may store instructions corresponding to the operations of FIG. 4 and/or any techniques described herein. Thus, in one embodiment, instructions corresponding to processing system 120 may be stored on computer-readable medium 500.

Note that more generally, program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as Perl. Note that as used herein, the term "computer-readable medium" refers to a non-transitory computer readable medium.

Computer System

Figure 6:
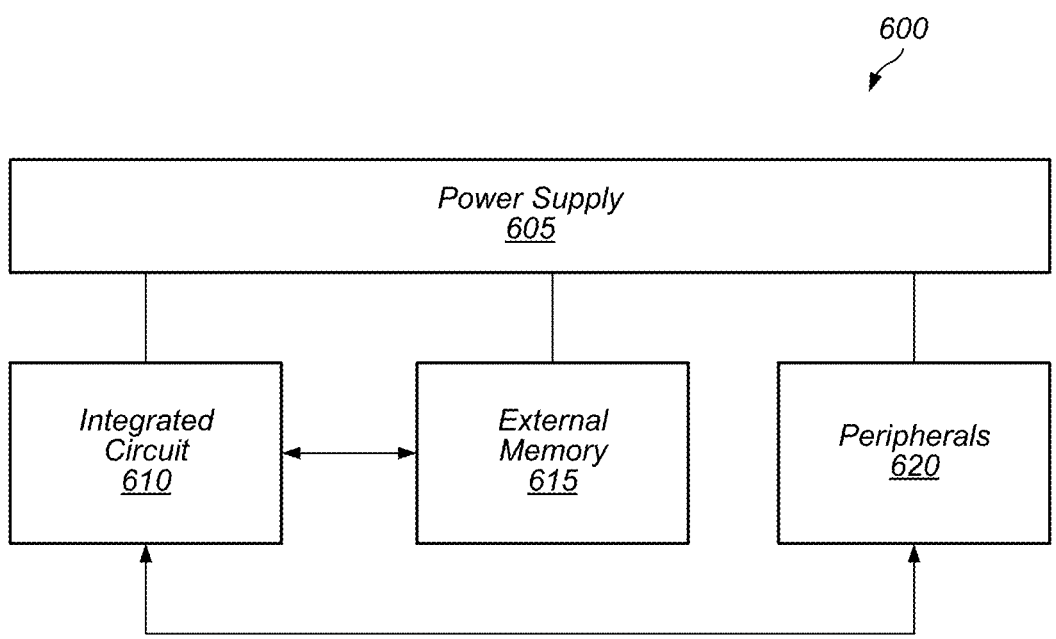
FIG. 6 is a block diagram of a system, according to some embodiments.

In FIG. 6, one embodiment of a computer system 600 is illustrated. Various embodiments of this system may be processing system 120, transaction system 160, or any other computer system as discussed above and herein.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices. By way of further explanation, in some embodiments system 600 may include multiple computers or computing nodes that are configured to communicate together (e.g. computing cluster, server pool, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system, comprising:
   a processor; and
   a non-transitory computer-readable medium having stored thereon instructions that are executable by the processor to cause the computer system to perform operations comprising:
      accessing web click stream data, the web click stream data comprising a plurality of uniform resource locators (URLs) accessible by users of an electronically provided service, the URLs consisting of a plurality of character strings that include one or more backslashes;
      tokenizing each of the character strings into one or more respective sub-string tokens that are separated from one another by the one or more backslashes;
      storing the sub-string tokens for each of the character strings in an initial data store;
      processing the initial data store to produce a token probability lookup table, wherein the processing includes:
         storing, in the token probability lookup table, sub-string tokens and a count associated with each sub-string token, each sub-string stored in the token probability lookup table meeting a threshold probability level; and
         discarding sub-string tokens that do not meet the threshold probability level;
      receiving a request to classify an unprocessed character string;
      tokenizing the unprocessed character string; and
      producing a cleaned string from the unprocessed character string by discarding any tokens from the unprocessed character string that are not present in the token probability lookup table.

2. The computer system of claim 1, wherein the operations further comprise:
processing the plurality of character strings into a cleaned strings table, including eliminating tokens from the plurality of character strings that are not present in the token probability lookup table.

3. The computer system of claim 2, wherein each of the plurality of character strings is labeled as belonging to a category in a plurality of categories; and
wherein processing the plurality of character strings into the cleaned strings table comprises:
avoiding any duplicate strings being stored in the cleaned strings table; and
labeling each of the strings in the cleaned strings table, according to a model, as belonging to one of the plurality of categories.

4. The computer system of claim 3, wherein the model used to label the strings in the cleaned strings table is a Bayesian network.

5. The computer system of claim 1, wherein the operations further comprise:
receiving a user request associated with the unprocessed character string;
categorizing the cleaned string into one of a plurality of categories based on a model; and
causing an action to be taken in response to the user request based on the category for the cleaned string.

6. The computer system of claim 5, wherein the action includes approving the user request or denying the user request.

7. The computer system of claim 1, wherein the operations further comprise: before the tokenizing, removing a predefined segment of the URLs from each of the URLs, wherein the tokenizing is performed on remaining segments of the URLs.

8. A method, comprising:
receiving, at a computer system, web click stream data comprising one or more uniform resource locators (URLs), the URLs each including a respective unprocessed character string that includes one or more pre-defined de-limiters;
the computer system tokenizing the unprocessed character string, including dividing the unprocessed character string into a plurality of sub-string tokens at least in part based on the one or more predefined de-limiters; and
producing a cleaned string from the unprocessed character string by discarding any tokens from the unprocessed character string that are not present in a token probability lookup table, wherein the token probability lookup table was created using operations comprising:
accessing a plurality of character strings;
tokenizing each of the character strings into one or more respective sub-string tokens;
storing the sub-string tokens for each of the character strings in an initial data store; and
processing the initial data store to produce a token probability lookup table, wherein the processing includes storing, in the token probability lookup table, sub-string tokens and a count associated with each sub-string token, each sub-string stored in the token probability lookup table meeting a threshold probability level.

9. The method of claim 8, wherein the one or more pre-defined de-limiters include a backslash.

10. The method of claim 8, further comprising: labeling the cleaned string as belonging to one of a plurality of categories.

11. The method of claim 10, wherein the labeling is performed based on a cleaned strings table created from a learning model, wherein strings in the cleaned strings table are labeled with various ones of the plurality of categories.

12. The method of claim 8, further comprising:
receiving a user request associated with the unprocessed character string;
categorizing the cleaned string into one of a plurality of categories based on a model; and
causing an action to be taken in response to the user request based on the category for the cleaned string.

13. The method of claim 12, wherein causing the action to be taken includes transmitting the category for the cleaned string via an electronic communications network.

14. The method of claim 12, wherein the action comprises an escalation of a risk level for a transaction requested via the user request.

15. The method of claim 12, wherein the action includes approving the user request or denying the user request.

16. A non-transitory computer-readable medium having stored thereon instructions that are executable by a computer system to cause the computer system to perform operations comprising:
receiving web click stream data comprising a plurality of uniform resource locators (URLs) accessible by users of an electronically provided service, the URLs each corresponding to a respective unprocessed character string comprising one or more predefined de-limiters;
tokenizing the unprocessed character string, including dividing the unprocessed character string into a plurality of sub-string tokens separated from one another by the one or more predefined de-limiters; and
producing a cleaned string from the unprocessed character string by discarding any tokens from the unprocessed character string that are not present in a token probability lookup table, wherein the token probability lookup table was created using operations comprising:
accessing a plurality of character strings;
tokenizing each of the character strings into one or more respective sub-string tokens;
storing the sub-string tokens for each of the character strings in an initial data store; and
processing the initial data store to produce a token probability lookup table, wherein the processing includes storing, in the token probability lookup table, sub-string tokens and a count associated with each sub-string token, each sub-string stored in the token probability lookup table meeting a threshold probability level.

17. The non-transitory computer-readable medium of claim 16, wherein the operations further comprise:
processing the plurality of character strings into a cleaned strings table, including eliminating tokens from the plurality of character strings that are not present in the token probability lookup table.

18. The non-transitory computer-readable medium of claim 17,
wherein each of the plurality of character strings is labeled as belonging to a category in a plurality of categories; and
wherein processing the plurality of character strings into the cleaned strings table comprises:
avoiding any duplicate strings being stored in the cleaned strings table; and labeling each of the strings in the cleaned strings table, according to a model, as belonging to one of the plurality of categories.

19. The non-transitory computer-readable medium of claim 18, wherein the model used to label the strings in the cleaned strings table is a Bayesian network.

20. The non-transitory computer-readable medium of claim 16, wherein the operations further comprise:
   receiving a user request associated with the unprocessed character string;
   categorizing the cleaned string into one of a plurality of categories based on a model; and
   causing an action to be taken in response to the user request based on the category for the cleaned string.

* * * * *